US011935092B2

(12) United States Patent
Sarkissian (10) Patent No.: US 11,935,092 B2
(45) Date of Patent: *Mar. 19, 2024

(54) SECURE MULTI-FACTOR TOKENIZATION-BASED PUSH/RESPONSE COMMERCE PLATFORM

(71) Applicant: TBOL, Inc., Surprise, AZ (US)

(72) Inventor: Shaunt M. Sarkissian, Reno, NV (US)

(73) Assignee: TBOL, Inc., Surprise, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/048,263

(22) Filed: Oct. 20, 2022

(65) Prior Publication Data

US 2023/0153798 A1 May 18, 2023

Related U.S. Application Data

(63) Continuation of application No. 17/024,142, filed on Sep. 17, 2020, now Pat. No. 11,507,946, which is a
(Continued)

(51) Int. Cl.
*G06Q 30/0251* (2023.01)
*G06Q 20/32* (2012.01)
(Continued)

(52) U.S. Cl.
CPC ..... *G06Q 30/0253* (2013.01); *G06Q 20/3674* (2013.01); *G06Q 20/40145* (2013.01); *G06Q 20/405* (2013.01); *G06Q 30/0268* (2013.01)

(58) Field of Classification Search
CPC ............ G06Q 20/326; G06Q 20/3674; G06Q 20/40145; G06Q 20/405; G06Q 30/0253; G06Q 30/0268
(Continued)

(56) References Cited

U.S. PATENT DOCUMENTS

2007/0186105 A1  8/2007  Bailey et al.
2011/0196731 A1* 8/2011  Christie ............. G06Q 30/0225
726/6
(Continued)

FOREIGN PATENT DOCUMENTS

AU  2017264693 A1  12/2018
CA    3023912 A1  11/2017
(Continued)

OTHER PUBLICATIONS

Todd Andrew Holmes, The influence of self-brand congruity, ad position, and ad duration on the effectiveness of online video advertising, 2015, pp. 123, 127 (Year: 2015).*
(Continued)

*Primary Examiner* — Mohammad A. Nilforoush
*Assistant Examiner* — Wodajo Getachew
(74) *Attorney, Agent, or Firm* — K&L Gates LLP (57) ABSTRACT

Example methods, apparatuses, and systems are presented that allows a user to make a secure purchase online, directly through accessing an online advertisement and without being redirected to multiple, cumbersome webpages to process different pieces of information to complete the transaction, while still leveraging existing e-commerce entities, such as existing payment platforms and existing ad/content networks. The present system includes a commerce ads engine (CA engine) that interfaces with the user through an app associated with the CA engine, a tokenization platform for authentication of the user, and a merchant providing relevant offer and check out information about a product being advertised in an online ad. The present system integrates new information embedded into online advertisements that interfaces with the CA engine and allows for the user to reliably provide authentication while purchasing the
(Continued)

desired product, and without accessing or being redirected to multiple websites as is conventionally done.

21 Claims, 6 Drawing Sheets

Related U.S. Application Data continuation of application No. 15/590,907, filed on May 9, 2017, now Pat. No. 11,556,920.

(60) Provisional application No. 62/333,748, filed on May 9, 2016.

(51) Int. Cl.
*G06Q 20/36* (2012.01)
*G06Q 20/40* (2012.01)

(58) Field of Classification Search
USPC .......................................................... 705/14
See application file for complete search history.

(56) References Cited

U.S. PATENT DOCUMENTS

| | | | | |
|---|---|---|---|---|
| 2013/0054336 A1* | 2/2013 | Graylin | ................. | G06Q 40/02 705/21 |
| 2013/0246173 A1* | 9/2013 | Berkley | ................. | G06Q 30/02 705/14.53 |
| 2013/0262315 A1* | 10/2013 | Hruska | .............. | G06Q 20/3276 705/67 |
| 2014/0279475 A1 | 9/2014 | Castrechini et al. | | |
| 2015/0032627 A1 | 1/2015 | Dill et al. | | |
| 2015/0112790 A1 | 4/2015 | Wolinsky et al. | | |
| 2015/0113604 A1 | 4/2015 | Oyman | | |
| 2015/0134431 A1* | 5/2015 | Georgoff | ............ | G06Q 30/0207 705/14.13 |
| 2015/0264020 A1 | 9/2015 | Ackerly et al. | | |
| 2015/0269569 A1 | 9/2015 | Sarkissian et al. | | |
| 2015/0310419 A1 | 10/2015 | Kadaster et al. | | |
| 2015/0363808 A1 | 12/2015 | Maggio | | |
| 2015/0379552 A1* | 12/2015 | Kent | .................... | G06Q 20/202 705/14.38 |
| 2016/0055322 A1* | 2/2016 | Thomas | ................. | G06F 21/31 726/7 |
| 2017/0323296 A1 | 11/2017 | Sarkissian | | |

FOREIGN PATENT DOCUMENTS

| | | |
|---|---|---|
| EP | 3455810 A1 | 3/2019 |
| JP | 6799222 B2 | 12/2020 |

OTHER PUBLICATIONS

International Search Report and Written Opinion for International PCT Application No. PCT/US2017/031804, dated Aug. 1, 2017.

\* cited by examiner

SECURE MULTI-FACTOR TOKENIZATION-BASED PUSH/RESPONSE COMMERCE PLATFORM

CROSS REFERENCE TO RELATED APPLICATION

This application is a continuation of U.S. patent application Ser. No. 15/590,907, filed May 9, 2017, titled "SECURE MULTI-FACTOR TOKENIZATION-BASED PUSH/RESPONSE COMMERCE PLATFORM" and claims the benefit of U.S. Provisional Application 62/333,748, filed May 9, 2016, and titled, "SECURE MULTI-FACTOR TOKENIZATION-BASED PUSH/RESPONSE COMMERCE PLATFORM," each of which are hereby incorporated herein by reference in their entireties and for all purposes.

TECHNICAL FIELD

The subject matter disclosed herein generally relates to processing data. In some example embodiments, the present disclosures relate to methods for providing a secure, multi-factor tokenization-based push/response commerce platform.

BRIEF SUMMARY

Aspects of the present disclosure are presented for a method of a commerce ads for improving secure transactions between a merchant and a customer. In some embodiments, a method of the commerce ads engine includes: storing, by the commerce ads engine, a fragmented authentication token received from a tokenization platform, the fragmented authentication token associated with a payment checkout platform such that the fragmented authentication token, when passed to the payment checkout platform, authenticates a checkout process at the payment checkout platform only one time before expiring; transmitting, by the commerce ads engine, the fragmented authentication token to a customer device associated with the customer, such that the fragmented authentication token is now uniquely associated with the customer device; storing, by the commerce ads engine, merchant offer data associated with an offer to sell a product of a merchant, the merchant offer data including an offer ID that uniquely identifies the merchant offer; transmitting, by the commerce ads engine, the merchant offer data to an advertisement content network, wherein the merchant offer data is converted into a digital advertisement about the merchant offer to sell the product and includes a digital link configured to pass along the offer ID to the customer device when the digital advertisement is selected by the customer; receiving, by the commerce ads engine from the customer device, the offer ID passed from the digital advertisement, and an authenticated fragmented token, the authenticated fragmented token comprising the fragmented authentication token that is authenticated by an authentication process with the customer device; determining, by the commerce ads engine, that the customer initiated an acceptance of the merchant offer, based on reliably correlating the received offer ID with the merchant associated with the merchant offer, and reliably correlating the received authenticated token with the customer device it is associated with; accessing customer payment information associated with the customer, based on verifying the customer using the authenticated fragmented token; accessing merchant account information associated with the merchant, based on verifying the merchant using the received offer ID; and initiating, by the commerce ads engine, a secure checkout procedure with a payment checkout platform for the purchase of the offered product, by transmitting to the payment checkout platform at least a subset of the merchant offer data, the merchant account information, the customer payment information, and the authenticated fragmented token.

In some embodiments, the method further comprises receiving, from the payment checkout platform, settlement data about the purchase of the offered product by the customer.

In some embodiments, the method further comprises transmitting the settlement data to a digital domain of the merchant to create a checkout transaction for the purchase of the offered product by the customer.

In some embodiments of the method, receiving, by the commerce ads engine from the customer device, the offer ID passed from the digital advertisement, comprises receiving the offer ID from a digital wallet application stored in the customer device.

In some embodiments of the method, the authenticated fragmented token is authenticated using a biometric reading of the customer.

In some embodiments, a second method of a commerce ads engine to improve secure transactions between a merchant and a customer is disclosed. The second method may include: storing, by the commerce ads engine, a fragmented authentication token received from a tokenization platform, the fragmented authentication token associated with a payment checkout platform such that the fragmented authentication token, when passed to the payment checkout platform, authenticates a checkout process at the payment checkout platform only one time before expiring; transmitting, by the commerce ads engine, the fragmented authentication token to a customer device associated with the customer, such that the fragmented authentication token is now uniquely associated with the customer device; storing, by the commerce ads engine, merchant offer data associated with an offer to sell a product of a merchant, the merchant offer data including an offer ID that uniquely identifies the merchant offer; transmitting, by the commerce ads engine, the merchant offer data to an advertisement content network, wherein the merchant offer data is converted into a digital advertisement about the merchant offer to sell the product and includes a digital link configured to pass along the offer ID to the customer device when the digital advertisement is selected by the customer; receiving, by the commerce ads engine from the digital advertisement, the offer ID and an authenticated fragmented token, the authenticated fragmented token comprising the fragmented authentication token that is authenticated by an authentication process with the customer device, wherein the offer ID and the authenticated fragmented token are embedded in the digital advertisement; determining, by the commerce ads engine, that the customer initiated an acceptance of the merchant offer, based on reliably correlating the received offer ID with the merchant associated with the merchant offer, and reliably correlating the received authenticated token with the customer device it is associated with; accessing customer payment information associated with the customer, based on verifying the customer using the authenticated fragmented token; accessing merchant account information associated with the merchant, based on verifying the merchant using the received offer ID; and initiating, by the commerce ads engine, a secure checkout procedure with a payment checkout platform for the purchase of the offered product, by transmitting to the payment checkout platform at least a subset of the merchant offer data, the merchant account information, the customer payment information, and the authenticated fragmented token.

BRIEF DESCRIPTION OF THE DRAWINGS

Some embodiments are illustrated by way of example and not limitation in the figures of the accompanying drawings.

DETAILED DESCRIPTION

Example methods, apparatuses, and systems (e.g., machines) are presented for providing secure transactions through direct interface with digital advertisements in connection with a merchant of the advertisement and secure payment platforms. As e-commerce continues its inevitable growth through the information and digital age, providing more seamless and secure methods of completing online transactions become ever more pervasive and important. A common problem, however, includes providing reliable authentication of users amidst the many fraudulent tactics and pitfalls that merchants, online users, and financial institutions must guard against. On the other hand, it is desirable for the transactions to be intuitive, user-friendly, and fast, to minimize any extraneous effort customers must perform just to make a simple purchase.

Practically speaking, there exist several distinct entities whose functionalities integrate together to bridge online merchants with online users, including ad/content networks to provide advertisements of merchants to appropriate online users, payment processing platforms, such as Paypal® or Visa Checkout®, and the websites of merchants themselves. Currently, conducting a purchase by a user who responds to an online advertisement requires the user to be redirected to usually multiple websites of each of the different aforementioned entities. Stopping at each different website usually satisfies a different purpose, including separately authenticating the user, separately purchasing the product, and separately verifying means for purchasing the product. It would be desirable to create a more seamless and intuitive experience for a user to purchase a product online, starting from an advertisement being offered to the user in a typical publisher website (i.e., a website providing content (e.g., CNN.com, ESPN.com, etc.) that is unaffiliated with either the merchant or the payment platform), that minimizes the number of redirections required just for a user to make a simple purchase, while still providing reliable authentication of the user and his or her payment information.

Aspects of the present disclosure are presented for a system that allows a user to make a secure purchase online, directly through accessing an online advertisement and without being redirected to multiple, cumbersome webpages to process different pieces of information to complete the transaction, while still leveraging existing e-commerce entities, such as existing payment platforms and existing ad/content networks. The system of the present disclosures includes introduction of a commerce ads engine (CA engine) that interfaces with the user through an app associated with the CA engine, a tokenization platform for authentication of the user, and a merchant providing relevant offer and check out information about a product being advertised in an online ad. The system presented herein integrates new information embedded into online banners or ads that interfaces with the CA engine and allows for the user to reliably provide authentication while purchasing the desired product, and without accessing or being redirected to multiple websites as is conventionally done. Further details about this novel system will be described below, in relation to the figures.

Figure 1:
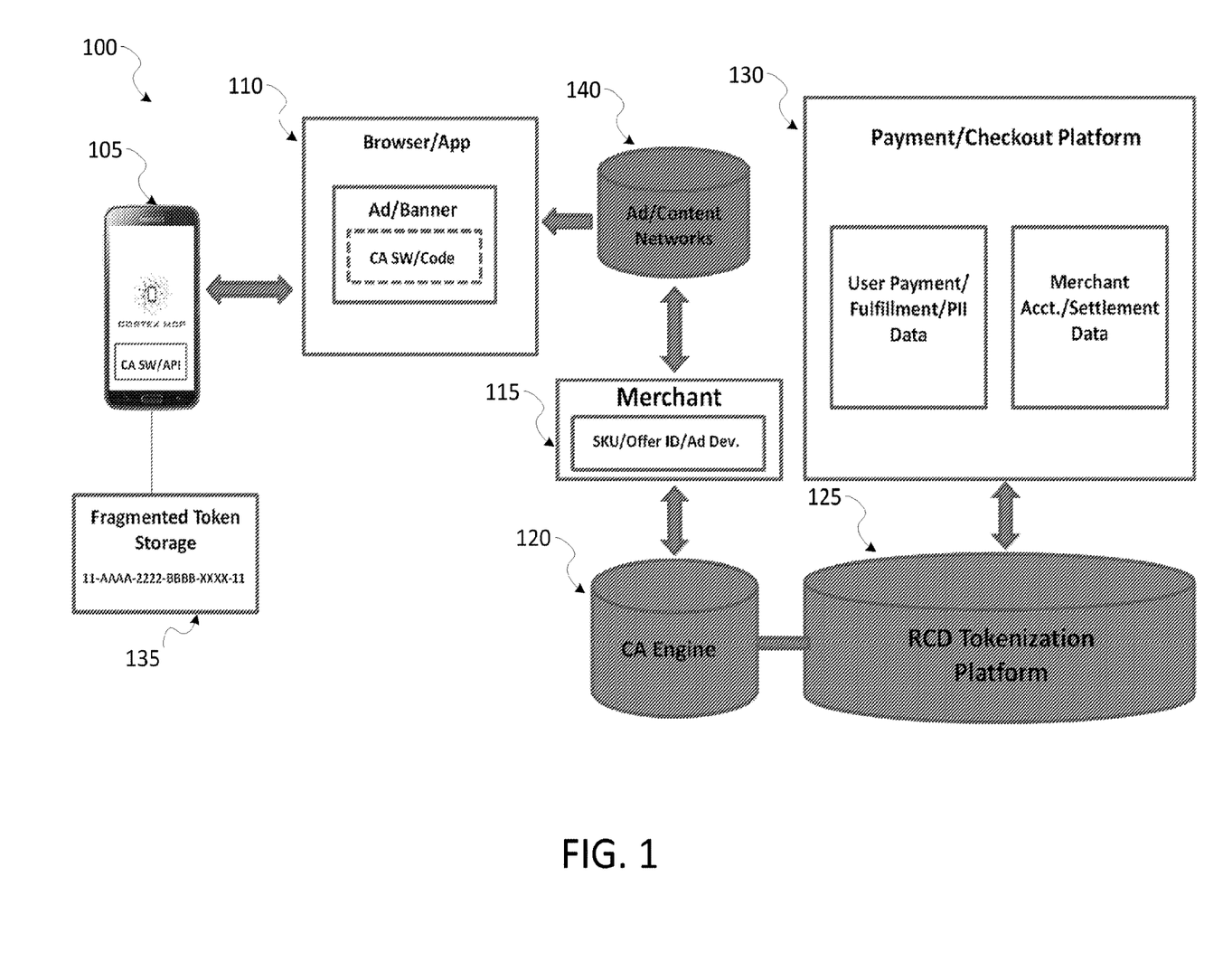
FIG. 1 is a system diagram illustrating an example system environment suitable for aspects of the present disclosure, according to some example embodiments.

Referring to FIG. 1, illustration 100 provides a system diagram of an example network illustrating the various interactions between systems of the present disclosures and conventional e-commerce entities typically used today. As shown, the system diagram includes a user device 105 that is capable of viewing online advertisements when browsing through web content. Example online website 110 is shown that may be displayed in the user device 105. The website 110 may be displayed in a browser or an application downloaded onto the user device 105. It may include an ad or a banner that provides content about a product being offered for sale by a merchant 115. Embedded in this online advertisement is a particular link or code provided by the commerce ads engine (CA engine) 120, and will be discussed in more detail below.

The online advertisement in the website 110 may be provided by a conventional advertisement or content network 140. Typically, these networks 140 allow merchants to create ad campaigns, where the networks facilitate dissemination of the merchant's ads to publisher websites who will display the advertisements. Ad/content networks 140 try to improve the efficiency of the advertisements by helping to display advertisements in publisher websites that are more likely to reach relevant customers/viewers who may be more interested in the merchant's advertisements. Since ad/content networks 140 facilitate more intelligent dissemination of merchant advertisements, and since they reach millions or even tens of millions of viewers, it may be desirable to provide more seamless purchasing experiences while utilizing the existing capabilities of the ad/content networks 140.

Shown here also is an example merchant 115. The merchant 115 is the entity in this example that supplies a product or service for sale and wants to communicate and offer to the user of the device 105. The merchant 115 may control a website and offer sales of products or services through the website. In conventional instances, the merchant 115 may utilize the ad/content network 140 to construct an ad campaign for displaying advertisements that can be disseminated to publisher websites that are frequently viewed by users, such as users of device 105. Conventionally, these advertisements may contain a link that directs the user back to a website of the merchant 115. There, the user may continue to try to purchase a product by interfacing with the merchant's website. This process may be slow and cumbersome at times, because the merchant may require login information, registering if a new user to the website, entering in billing and shipping information, as well as specifying other details about what product the user actually wishes to purchase. Before finishing any one of these steps, the user may simply be too frustrated or lack all the information necessary to complete the purchase, and may simply give up on trying to complete the process. It would be more desirable if the user could more seamlessly and intuitively purchase the product after seeing it in the ad.

Also shown is a payment/checkout platform 130. This component includes existing systems and networks designed to connect merchants with payment accounts of the users in a secure manner. Examples include PayPal®, Visa Checkout®, and the like. These platforms 130 contain user information related to payment accounts, login IDs, authentication questions, and the like. This also contains merchant information related to account IDs, settlement data, routing information, and the like. Conventionally, in order to complete a transaction, a user wishing to make a purchase on the merchant's website would then be redirected to a checkout page that may be facilitated by the payment/checkout platform 130 or be directly transferred over to a separate page on the website of the payment/checkout platform 130. Unfortunately, this may be yet another page that the user needs to be directed to in order to complete the purchase. The user may need to sign in to yet another webpage or account, include additional information, and may altogether be frustrated or too tired to complete the transaction.

FIG. 1 provides an example system to help alleviate at least some of these issues. Included herein is the commerce ads (CA) engine 120, which provides functionality to address a number of these issues. In some embodiments, the CA engine 120 is a unique multipurpose ID/token processing and correlation engine, combined with merchant on-demand offer and creation/management. For example, the CA engine 120 may provide new functionality and information to embed in an online advertisement or banner. This new information may provide a direct link back to the CA engine 120 when a user of the device 105 clicks on the ad or banner. The CA engine 120 may also store exact information about the specific offer that the merchant 115 wishes to communicate through the online advertisement. This information may be provided by each merchant who has access to a user interface of the CA engine 120. For example, a merchant who subscribes to utilize the CA engine 120 may enter details about an offer for a product into the CA engine 120 to be advertised. The offer details may include what type of product, the cost, any expiration (e.g., only upon seeing the offer), and how many units to be provided under the terms of the offer. The created offer will also generate an offer ID that identifies the particular offer made by the merchant. This offer ID may be passed along with any ad or banner to reliably correlate back to the correct offer. The CA engine 120 may be configured to package this information into an offer that may be facilitated by the Ad/Content Network 140. This offer may be supplied to the user device 105 through an ad that appears in a browser or an app 110 on the user's device 105. The ad may contain a specific URL that leads to a mechanism that directs the user back to the CA engine 120. In some embodiments, this direction will occur through an associated app on the user device 105 that is configured to process the URL in the ad and a fragmented token 135 (see FIGS. 4 and 5). In other cases, the URL will redirect the user device 105 to contact the CA engine 120 directly (see FIG. 2). Thus, by directing the user to the CA engine 120, the user may already have access to the specific offer information supplied by the merchant.

In addition, the CA engine 120 contains a correlation engine configured to correlate authentication tokens 135 stored in the user device 105 with existing ID information of a conventional payment/checkout platform 130. The correlation may be possible due to the RCD tokenization platform 125 having previously supplied a fragmented token associated with the user onto the user device 105, through the CA engine 120. Each fragmented token 135 is unique, and may be used only once to authenticate the user once passed from the mobile device 105 and ultimately to the CA engine 120. Along with the fragmented token 135 reaching the CA engine 120, the offer ID passed from the CA engine 120 into the ad (e.g., in browser/app 110), that is clicked on by the user in the mobile device 105, may be transmitted back to the CA engine 120, e.g., via an app or software (SW) script on the mobile device 105 configured to communicate with the CA engine 120. As the CA engine receives both the fragmented token 135 and the offer ID, the correlation engine will be able to associate the user, authenticated by the fragmented token 135, with the offer associated with the offer ID. The offer ID is also of course associated with the merchant that created the offer. The CA engine 120 may contain the payment/checkout platform information associated with that particular merchant, and therefore, combining this information with the merchant associated with the offer ID, the correlation engine may be able to access the payment/checkout platform 130 with the correct merchant ID information. In this way, the CA engine 120 is capable of seamlessly connecting an offer of the merchant to a user device and conduct a checkout process automatically, without demanding the user fill out information he or she may not have or that may be too time consuming to complete.

In some embodiments, the CA engine 120 may be configured to instruct the RCD tokenization platform 125 to initiate a checkout process for the user of the user device 105 only upon receiving a properly authenticated fragmented token 135 from the user device 105 (that was, again, previously passed to the user device 105 at some arbitrary earlier time). In some embodiments, the fragmented token 135 may be designed to apply only to that particular device of the user, and used only for the checkout process once, but not tied to any particular offer until the user clicks on the desired ad (and initiates one of the example processes described herein). In this way, the RCD tokenization platform 125 has the proper information to correlate the merchant with the user for the specific offer that the user clicked on.

In some embodiments, the CA engine 120 includes the following features:
  i. Location where all CA ID's and corresponding merchant offer parameters are set-up and established by merchant 115.
  ii. Correlation engine that correlates all RCD's to established User ID in the Checkout Platform 130, and CA ID to Merchant MID in Checkout Platform 130.
  iii. Where all Ad embedded script and/or Ad Embedded URL, etc. will call to execute Commerce Ads process.
  iv. Centralized administration and reporting engine for the Merchant 115 and others who want to embed Commerce Ads capability.
  v. Acts as the de-facto interface module and engine for User App/API's, existing Checkout Platform 130, RCD Tokenization platform 125, merchant order platforms 115, ad/content networks 140, and other external existing platform systems.
  vi. Unique in market as serving as a both a processing platform and centralized Offer engine, in the same solution.

The CA engine 120 being used as part of the transaction process may allow for a user to purchase the desired product offered in an online advertisement without needing to be redirected to multiple other webpages, while still securely authenticating the user and securing the users financial information. The CA engine 120 provides unique functionality while still utilizing existing e-commerce structures, such as the ad/content network 140 and the payment/checkout platforms 130.

As previously mentioned, also shown in the system is an RCD tokenization platform 125. This platform 125 may be configured to provide fragmented tokens 135 transmitted to the user device 105 in order to authenticate the user. This platform may provide a separate Multi-factor tokenization engine to create a multi-factor token that is passed to the user device 105, as well as store in completed form in the CA Engine 120 for later processing. This authentication process may dovetail into the payment/checkout platform 130. The RCD tokenization platform 125 may already pre-authenticate the user before needing to access the payment/checkout platform 130. Examples of the RCD tokenization platform 125 include the descriptions in U.S. patent application Ser. No. 11/851,248, which is incorporated herein by reference.

Figure 2:
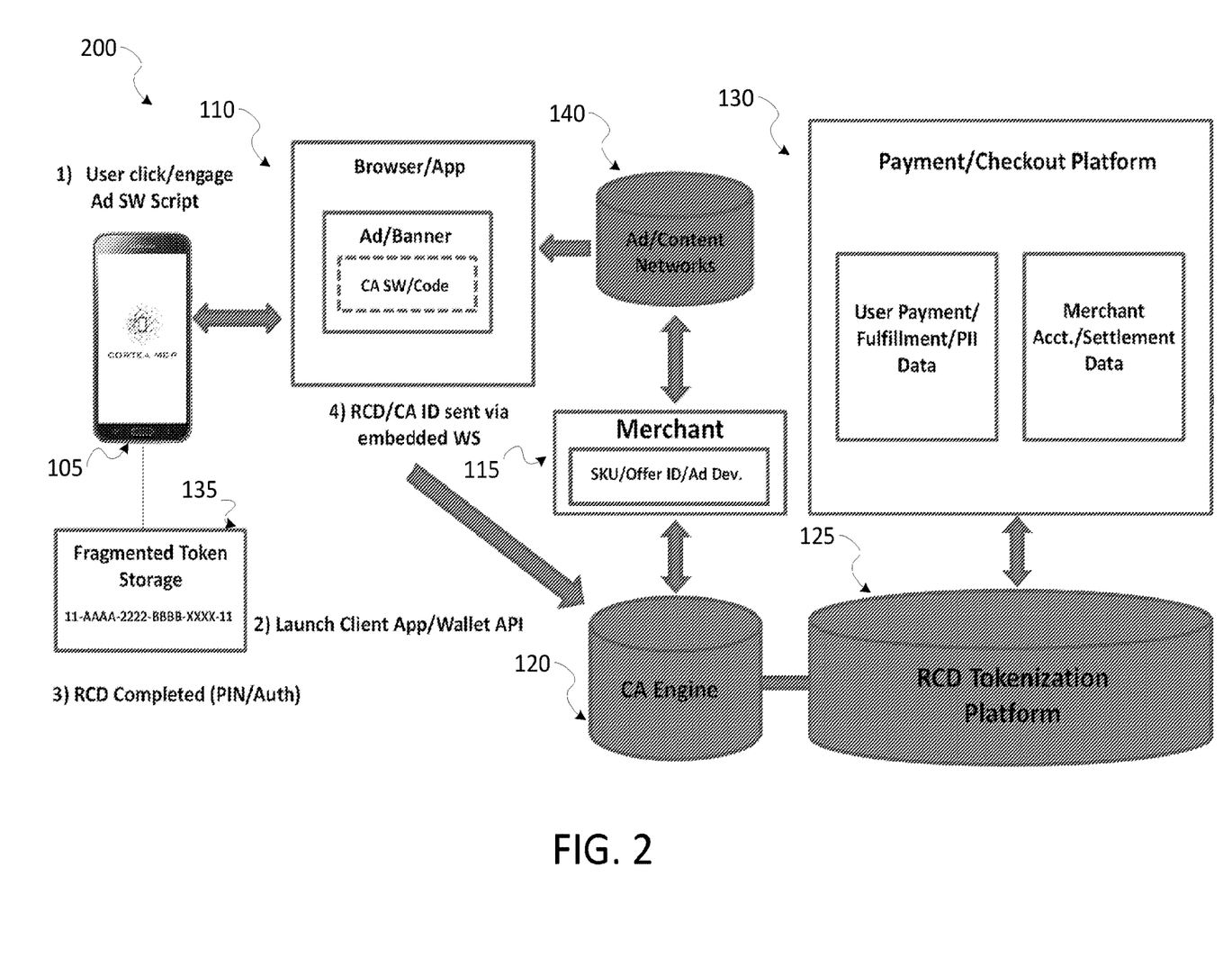
FIGS. 2 and 3 illustrate a first variant of an example process for performing a secure, multi-factor tokenization-based push/response online transaction, according to some example embodiments.

Referring to FIG. 2, illustration 200 provides example steps in a computer-implemented process for providing secure transactions between a user device 105 and the purchase of a product or service through an offer expressed in an ad by a merchant 115, according to some embodiments. This process expresses one variant through ad-based forwarding to the CA engine 120, according to some embodiments. The process first includes the offer of the merchant 115 being stored in the CA engine 120. The offer information may be transmitted to an ad/content network 140 as well, which then packages the offer into an ad/banner that is displayed in a browser/app 110. The ad/banner may also include the offer ID associated with the offer, and a URL that serves as a link to direct the user to another location, such as back to the CA engine 120 or to an app on the mobile device 105 that is configured to communicate with the CA engine 120 and utilize the fragmented token 135.

In this example, in step 1, the user clicks/engages with the ad. The ad can be shown and delivered in any number of locations and form factors, including in a mobile browser, an app, and other OS related locations. These would be any and all current and future locations where ads are located, that can be delivered by any ad serving provider, publisher, network, etc., such as the ad/content network 140. The user may engage with the ad by clicking on it, scrolling or flipping through the ad, exploring any interactive features of the ad, and so forth.

In the second step, a software (SW) Script in the ad auto triggers the launch of the User/Client App on the device, by calling the embedded App SW/API's. A user application launches, or if already open, is shown. This user application may be a part of an overall system that is configured to engage with the CA engine 120, according to some embodiments. The CA ID embedded in the banner is passed to the user application. The CA ID may be a marker that correlates in the CA engine 120 to what ad was being offered as specified by the merchant 115.

Once the app opens, in some embodiments, any content related to the CA ID/Offer is sent to the user application to show the relevant offer/product parameters. Data shown here can be text, images, active web content, etc. This allows the user to view the actual offer information that was embedded in the ad and was supplied by the merchant through the CA engine 120.

In a third step, the user enters authentication information, such as a PIN, biometric/algorithm, or any other related process step to complete authentication of the RCD.

In a fourth step, the user application interacts with an Embedded SW Script/API in the ad/banner, and passes the RCD to the banner. The banner then forwards the completed RCD plus the CA ID to CA Engine 120 for processing. These ads or banners may be specially designed to receive and store the RCD plus the CA ID, which may then be passed back to the CA engine 120. In this way, the acceptance of the offer by the user is seamlessly transitioned to the checkout process through the CA engine, without the user needing to enter additional information, but for maybe authentication information of the fragmented token (e.g., RCD).

Figure 3:
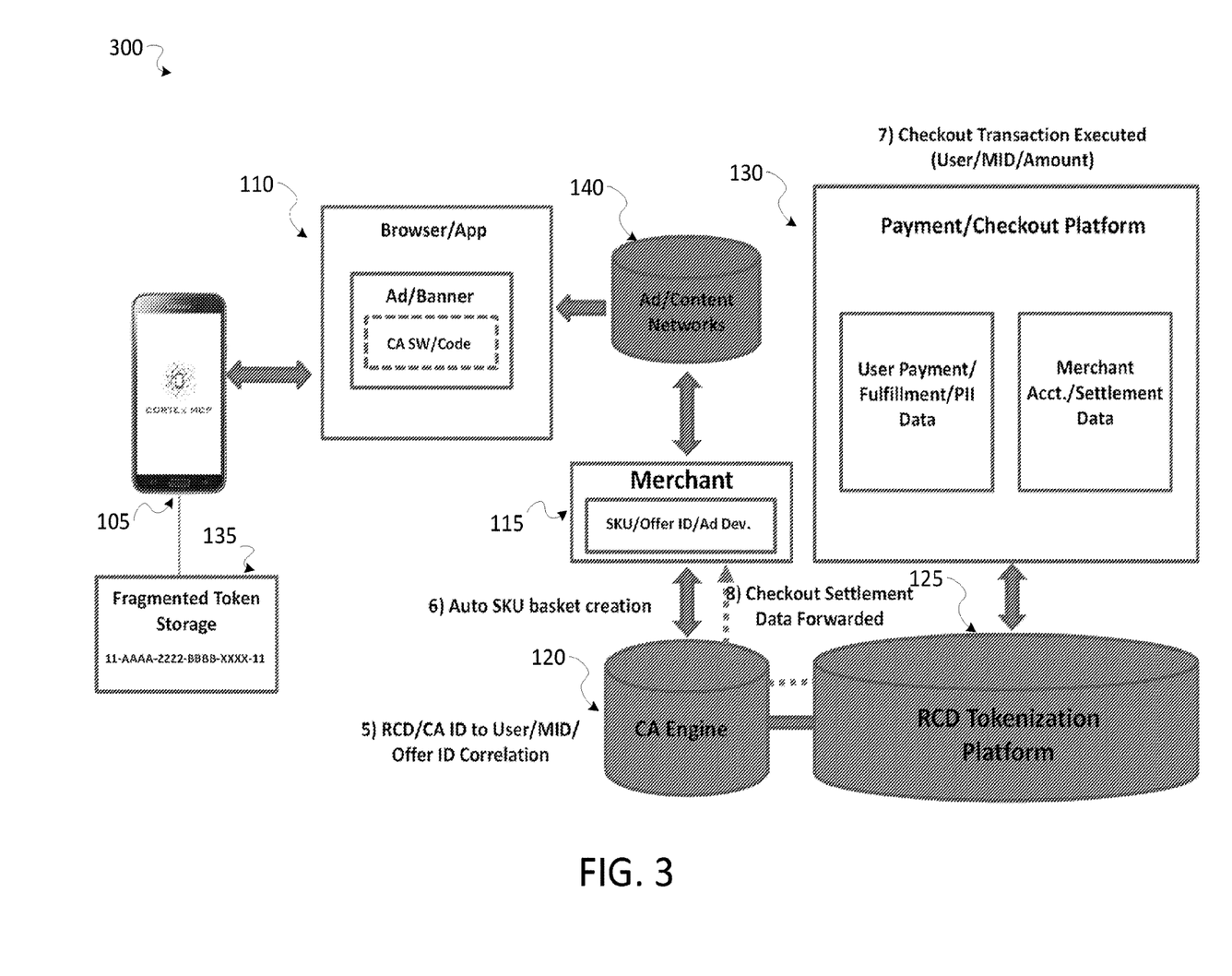

Referring to FIG. 3, illustration 300 provides further example details for finishing the process started in FIG. 2. For example, in a fifth step, the CA Engine 120 processes the data, and correlates the RCD to the User Data at the checkout platform 130 and the CA ID to the Merchant Offer and MID/Merchant account on file at the checkout platform 130. The merchant has already predefined the CA ID parameters in the CA Engine 120 to later forward to their internal merchant commerce/order platforms 115 for processing. This data will likely include the SKU, pricing, shipping parameters, and other offer relevant data to map to order management system (e-commerce platform, Magento, etc.).

In a sixth step, the CA ID order data is passed to the Merchant site 115, and a basket/order is created within the merchant platform for product/SKU. This may be accomplished through an automated script that interfaces the merchant website 115 from the CA engine 120 and is configured to automatically complete the information for a basket/order, using the information about the user that is authenticated via the fragmented token, and the offer ID that references all of the information about the merchant offer.

In a seventh step, the RCD is validated within the CA Engine 120, and is correlated to the User (and any other related User ID within Payment/Checkout platform).

In an eighth step, the CA ID is correlated to the Merchant MID (or other Checkout platform identifying data for the merchant), and MID data. The MID data, User Data, and amount is sent to the Checkout Platform 130 for processing.

The Checkout Platform 130 then processes the payment per a normal checkout platform process (e.g., authorizing payment data, amount, and processing through the merchant's standard merchant account or other related process).

The payment authorization and all other required fulfillment data to complete the merchant order process is then sent to the merchant 115, and the order is completed. Additional order data and acknowledgement may be sent back through the CA Engine 120 or can be sent through other methods to the user for order acknowledgement and reporting.

As discussed herein, the user may view just a single page in just a single app loaded into the user device 105. The authentication information is passed from the user device 105 in the form of a fragmented token 135 that is verifiable by the RCD tokenization platform. This enables the payment/checkout platform 130 to securely load any payment information automatically for the user, since the user is already authenticated. In addition, the app on the user device 105 is configured to display the offer information specified by the merchant 115 that is embedded in the ad/banner that the user clicked/selected. The user then needs to simply agree to the offer information, and the acceptance causes transfer of authentication and ad information to the CA engine 120, which has pre-stored correlation information to the merchant 115 and the merchant's offer. Therefore, correlating the offer details to the user, and authenticating the user to the user's payment information is performed behind the scenes, thereby allowing the user to not need to be directed to multiple other websites to perform these functions. In so doing, the user may effectively purchase a product "directly" through the clicking of the ad for the product, creating an intuitive and more seamless transaction experience while utilizing existing payment account information of the user (e.g., user account in payment/checkout platform) and merchant information (e.g., merchant products and merchant website).

Figure 4:
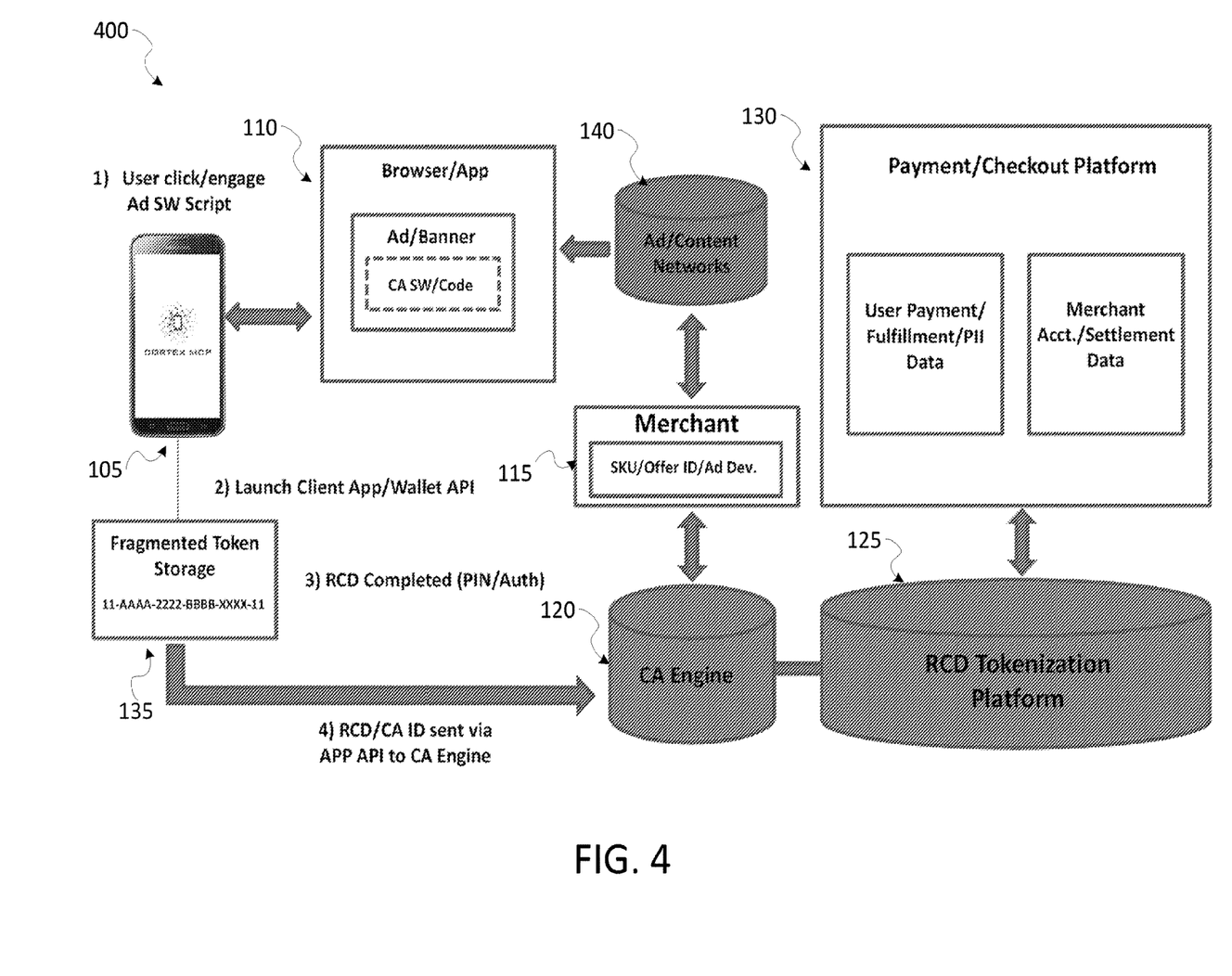
FIGS. 4 and 5 illustrate a second variant of an example process for performing a secure, multi-factor tokenization-based push/response online transaction, according to some example embodiments.
Figure 5:
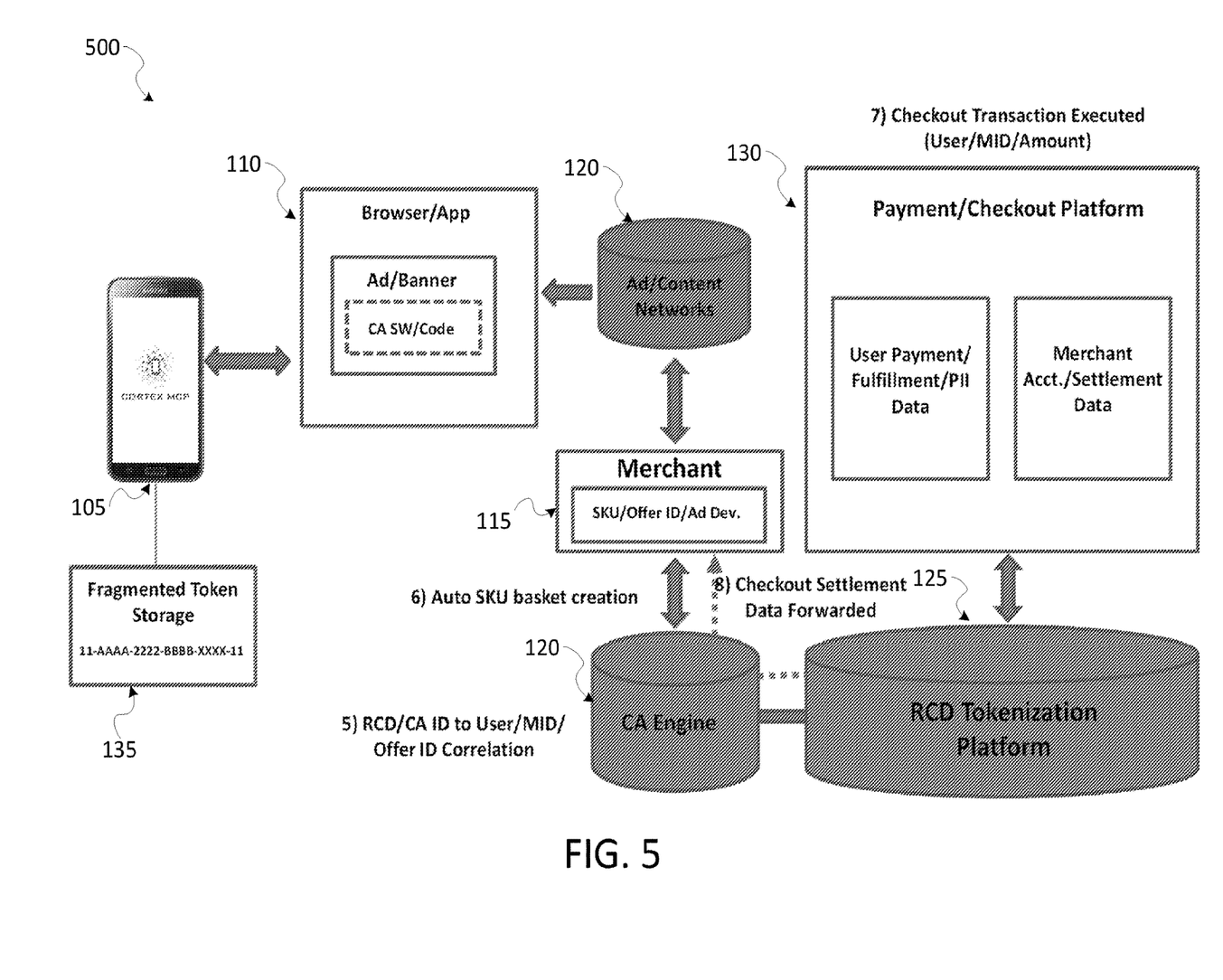

Referring to FIGS. 4 and 5, illustrations 400 and 500 show a second variant for completing a process according to aspects of the present disclosures. In this methodology, the application on the user device 105 may be configured to directly forward the relevant information to the CA engine 120, rather than send the information back through the ad.

The steps described in FIGS. 2 and 3 may be similar as here, except for two instances where the processing between the app in the user device 105 interfaces directly with the CA engine 120 rather than retrieves and passes information through the ad. Thus, one difference is that the information about the offer, such as price, product parameters, etc., may be retrieved from the CA engine rather than the ad. Some process steps here include that the App would pass the CA ID to CA Engine requesting content, and content is passed back. There may be actual multiple threads/web calls here—such as a link call to the CA Engine 120, CA Engine 120 back to launch App, App request CA ID info, data/info passed, etc. These multiple calls ultimately allow the app to download relevant information about the offer so that the user may make an informed purchase.

A second difference is that after the user enters a verifying action, such as a PIN or biometric/algorithm, to authenticate the user, the User Application passes an RCD, CA ID, and any other on-device existing security/authentication process to further ID the user (if necessary, and already existing), over to the CA engine 120. In some embodiments, any and all other secondary authenticators may be set up between the CA Engine 120 and app/user to provide additional authentication. Thus, the CA engine 120 may receive directly the authentication information, as well as the ID of the selected offer (expressed in the CA ID) in order to correlate the user to the intended offer for purchase. The remaining steps (see FIG. 5) may proceed as in the previous example (see FIG. 3).

In some embodiments, the CA API or SW script as introduced above may include the following features:
  i. User/App API's, integrated into User device based Applications.
  ii. Embedded AD SW Script/API's, for passing RCD and User ID via Ads to CA Engine (as described in the first example process, see FIGS. 2 and 3).
  iii. Merchant Commerce Platform Module (possible), custom software module that would exist on merchant side to communicate to CA Engine 120 and extract data needed for order processing and fulfillment. This can also be done by merchant coding to web service calls to make it happen, and may not need an actual "SW Module" that sits on Merchant services to proceed.

The AD SW script may be part of an app on the mobile device 105 that is configured to communicate with the CA engine. A URL embedded in the ab/banner may be configured to open the app, which may then launch the AD SW script to obtain the fragmented token 135 (RCD), transmit the RCD along with the user ID to the CA engine 120, and the associated offer ID of the ad/banner that represents the specific offer the user has selected.

Figure 6:
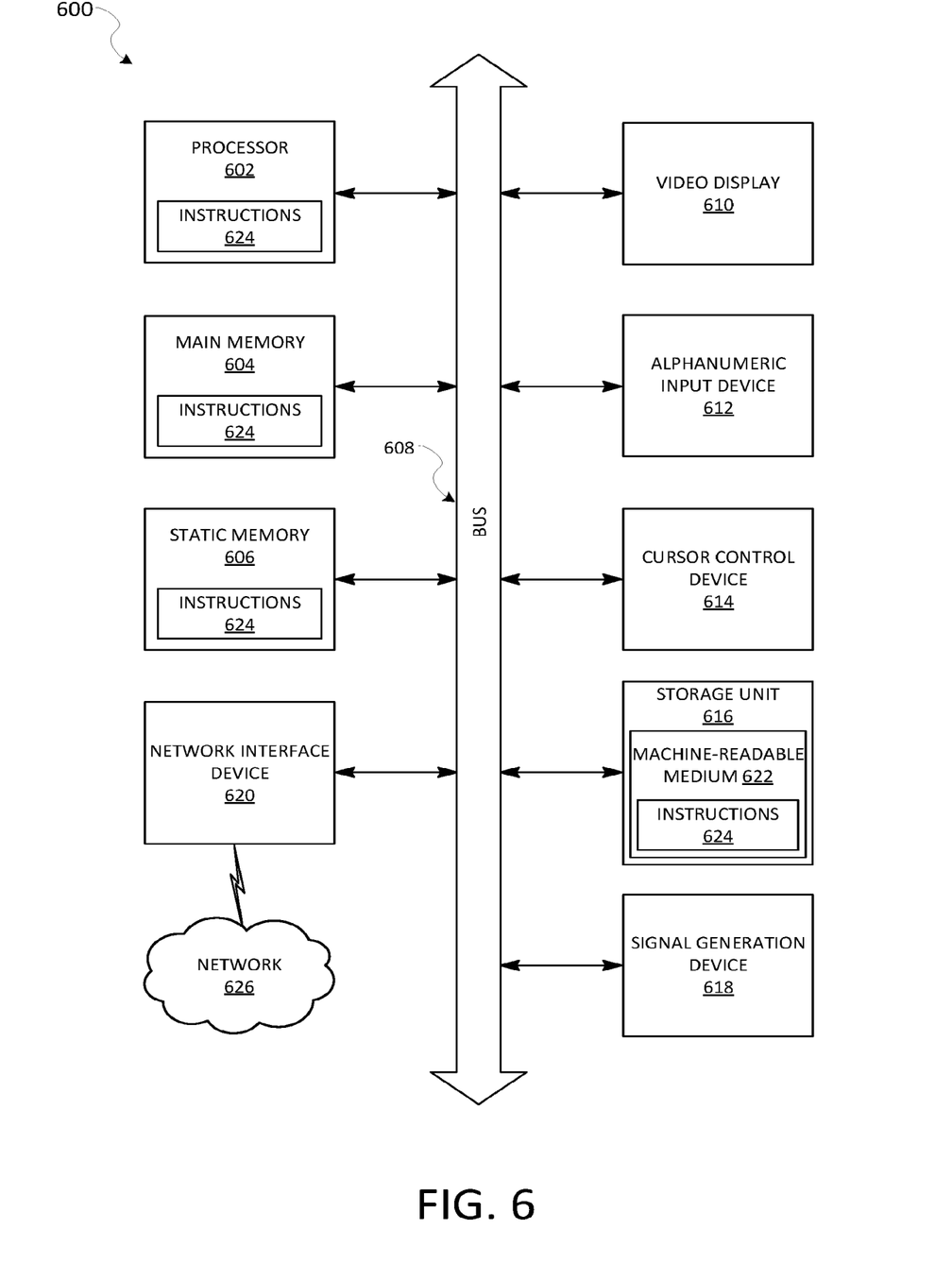
FIG. 6 is a block diagram illustrating components of a machine, according to some example embodiments, able to read instructions from a machine-readable medium and perform any one or more of the methodologies discussed herein.

Referring to FIG. 6, the block diagram illustrates components of a machine 600, according to some example embodiments, able to read instructions 624 from a machine-readable medium 622 (e.g., a non-transitory machine-readable medium, a machine-readable storage medium, a computer-readable storage medium, or any suitable combination thereof) and perform any one or more of the methodologies discussed herein, in whole or in part. Specifically, FIG. 6 shows the machine 600 in the example form of a computer system (e.g., a computer) within which the instructions 624 (e.g., software, a program, an application, an applet, an app, or other executable code) for causing the machine 600 to perform any one or more of the methodologies discussed herein may be executed, in whole or in part.

In alternative embodiments, the machine 600 operates as a standalone device or may be connected (e.g., networked) to other machines. In a networked deployment, the machine 600 may operate in the capacity of a server machine 110 or a client machine in a server-client network environment, or as a peer machine in a distributed (e.g., peer-to-peer) network environment. The machine 600 may include hardware, software, or combinations thereof, and may, as example, be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 624, sequentially or otherwise, that specify actions to be taken by that machine. Further, while only a single machine 600 is illustrated, the term "machine" shall also be taken to include any collection of machines that individually or jointly execute the instructions 624 to perform all or part of any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a video display 610 (e.g., a plasma display panel (PDP), a light emitting diode (LED) display, a liquid crystal display (LCD), a projector, a cathode ray tube (CRT), or any other display capable of displaying graphics or video). The machine 600 may also include an alphanumeric input device 612 (e.g., a keyboard or keypad), a cursor control device 614 (e.g., a mouse, a touchpad, a trackball, a joystick, a motion sensor, an eye tracking device, or other pointing instrument), a storage unit 616, a signal generation device 618 (e.g., a sound card, an amplifier, a speaker, a headphone jack, or any suitable combination thereof), and a network interface device 620.

The storage unit 616 includes the machine-readable medium 622 (e.g., a tangible and non-transitory machine-readable storage medium) on which are stored the instructions 624 embodying any one or more of the methodologies or functions described herein, including, for example, any of the descriptions of FIGS. 1-5. The instructions 624 may also reside, completely or at least partially, within the main memory 604, within the processor 602 (e.g., within the processor's cache memory), or both, before or during execution thereof by the machine 600. The instructions 624 may also reside in the static memory 606.

Accordingly, the main memory 604 and the processor 602 may be considered machine-readable media 622 (e.g., tangible and non-transitory machine-readable media). The instructions 624 may be transmitted or received over a network 626 via the network interface device 620. For example, the network interface device 620 may communicate the instructions 624 using any one or more transfer protocols (e.g., HTTP). The machine 600 may also represent example means for performing any of the functions described herein, including the processes described in FIGS. 1-5.

In some example embodiments, the machine 600 may be a portable computing device, such as a smart phone or tablet computer, and have one or more additional input components (e.g., sensors or gauges) (not shown). Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 622 able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database 115, or associated caches and servers) able to store instructions 624. The term "machine-readable medium" shall also be taken to include any medium, or combination of multiple media, that is capable of storing the instructions 624 for execution by the machine 600, such that the instructions 624, when executed by one or more processors of the machine 600 (e.g., processor 602), cause the machine 600 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium 622 is non-transitory in that it does not embody a propagating signal. However, labeling the tangible machine-readable medium 622 as "non-transitory" should not be construed to mean that the medium is incapable of movement; the medium should be considered as being transportable from one physical location to another. Additionally, since the machine-readable medium 622 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 622 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 602 or a group of processors 602) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 602 or other programmable processor 602. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses 608) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 602 that are temporarily configured (e.g., by software) or permanently configured to perform the relevant operations. Whether temporarily or permanently configured, such processors 602 may constitute processor-implemented modules that operate to perform one or more operations or functions described herein. As used herein, "processor-implemented module" refers to a hardware module implemented using one or more processors 602.

Similarly, the methods described herein may be at least partially processor-implemented, a processor 602 being an example of hardware. For example, at least some of the operations of a method may be performed by one or more processors 602 or processor-implemented modules. As used herein, "processor-implemented module" refers to a hardware module in which the hardware includes one or more processors 602. Moreover, the one or more processors 602 may also operate to support performance of the relevant operations in a "cloud computing" environment or as a "software as a service" (SaaS). For example, at least some of the operations may be performed by a group of computers (as examples of machines 600 including processors 602), with these operations being accessible via a network 626 (e.g., the Internet) and via one or more appropriate interfaces (e.g., an API).

The performance of certain operations may be distributed among the one or more processors 602, not only residing within a single machine 600, but deployed across a number of machines 600. In some example embodiments, the one or more processors 602 or processor-implemented modules may be located in a single geographic location (e.g., within a home environment, an office environment, or a server farm). In other example embodiments, the one or more processors 602 or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine 600 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The present disclosure is illustrative and not limiting. Further modifications will be apparent to one skilled in the art in light of this disclosure and are intended to fall within the scope of the appended claims.

What is claimed is:

1. A method to improve secure transactions between a merchant and a customer, the method comprising:
   receiving, by a commerce ads engine, a fragmented authentication token from a tokenization platform, wherein the fragmented authentication token authenticates a secure checkout procedure at a payment checkout platform;
   transmitting, by the commerce ads engine, the fragmented authentication token to a customer device;
   transmitting, by the commerce ads engine, merchant offer data associated with a product offered by the merchant to an advertisement content network, wherein the merchant offer data is converted into a digital advertisement comprising a digital link configured to pass along an offer ID to the customer device;
   receiving, by the commerce ads engine, the offer ID passed from the digital link of the digital advertisement and the fragmented authentication token from the customer device, wherein the fragmented authentication token has been authenticated by the customer device;
   correlating, by the commerce ads engine, the received offer ID with the merchant and the received authenticated fragmented authentication token with the customer device; and
   initiating, by the commerce ads engine, the secure checkout procedure by transmitting at least a subset of the merchant offer data, merchant account information, customer payment information, or the authenticated fragmented authentication token to the payment checkout platform for a purchase of the product.

2. The method of claim 1, further comprising receiving, by the commerce ads engine, settlement data about the purchase of the product from the payment checkout platform.

3. The method of claim 2, further comprising transmitting, by the commerce ads engine, the settlement data to a digital domain of the merchant to create a checkout transaction for the purchase of the offered product by the customer.

4. The method of claim 1, wherein the offer ID is received by the commerce ads engine from a digital wallet application stored on the customer device.

5. The method of claim 1, wherein the fragmented authentication token has been authenticated by the customer device via at least one of a PIN, a biometric reading, or an algorithmic authorization, or combinations thereof.

6. A method to improve secure transactions between a merchant and a customer, the method comprising:
   transmitting, by a commerce ads engine, a fragmented token to a customer device, wherein the fragmented token is configured to be authenticated by the customer;
   transmitting, by the commerce ads engine, merchant offer data associated with a product offered by the merchant to an advertisement content network, wherein the merchant offer data is converted into a digital advertisement comprising a digital link configured to pass along an offer ID to the customer device;
   receiving, by the commerce ads engine, the offer ID passed from the digital link of the digital advertisement and the fragmented authentication token from the customer device, wherein the fragmented authentication token has been authenticated by the customer device;
   correlating, by the commerce ads engine, the received offer ID with the merchant and the received authenticated fragmented authentication token with the customer device; and
   initiating, by the commerce ads engine, the secure checkout procedure by transmitting at least a subset of the merchant offer data, merchant account information, customer payment information, or the authenticated fragmented authentication token to the payment checkout platform for a purchase of the product.

7. The method of claim 6, wherein the secure checkout procedure utilizes customer payment information and merchant account information.

8. The method of claim 7, further comprising:
verifying, by the commerce ads engine, the merchant based on the offer identifier; and
accessing, by the commerce ads engine, the merchant account information based on the verification.

9. The method of claim 7, further comprising:
verifying, by the commerce ads engine, the customer based on the authenticated fragmented token; and
accessing, by the commerce ads engine, customer payment information based on the verification.

10. The method of claim 9, wherein the customer payment information is stored on a payment checkout platform configured to perform the secure checkout procedure.

11. The method of claim 6, further comprising:
receiving, by the commerce ads engine, settlement data generated by the secure checkout procedure.

12. The method of claim 6, wherein the customer authentication of the fragmented token is based on at least one of a PIN, a biometric reading, or an algorithmic authorization, or combinations thereof.

13. The method of claim 6, wherein the fragmented token is exclusively configured to be authenticated by the customer via the customer device.

14. The method of claim 6, wherein the fragmented token is exclusively configured to be authenticated by the customer once.

15. The method of claim 6, wherein, prior to transmission, the fragmented authentication token is linked to the advertisement upon a customer interaction with the interactive advertisement displayed by the customer device.

16. A secure authentication system for transactions between a merchant and a customer, the system comprising:
a tokenization platform configured to generate a fragmented authentication token configured to authenticate a secure checkout procedure at a payment checkout platform; and
a commerce ads engine comprising a processor and a memory, wherein the commerce ads engine is configured to:
receive the fragmented token from the tokenization platform, wherein the fragmented token is configured to be authenticated by the customer, transmit the fragmented token to a customer device;
transmit a merchant offer data to an advertisement content network, wherein the merchant offer data is converted into a digital advertisement about the merchant offer to sell the product, wherein the digital advertisement includes a digital link configured to pass along the offer ID to the customer device when the digital advertisement is selected by the customer;
receive, from the customer device, the offer ID passed from the digital link of the digital advertisement, and an authenticated fragmented token that is authenticated by an authentication process with the customer device;
correlate the received offer ID with the merchant associated with the merchant offer, and correlate the received authenticated fragmented token with the customer device; and
initiate a secure checkout procedure with a payment checkout platform for a purchase of the offered product, by transmitting to the payment checkout platform at least a subset of the merchant offer data, the merchant account information, the customer payment information, and the authenticated fragmented token.

17. The secure authentication system of claim 16, wherein the commerce ads engine is further configured to:
verify the merchant based on the offer identifier; and
access merchant account information based on the verification.

18. The secure authentication system of claim 16, wherein the commerce ads engine is further configured to:
verify the customer based on the authenticated fragmented token; and
accessing customer payment information based on the verification.

19. The secure authentication system of claim 18, wherein the customer payment information is stored on a payment checkout platform configured to perform the secure checkout procedure.

20. The secure authentication system of claim 16, wherein the customer authentication of the fragmented token is based on at least one of a PIN, a biometric reading, or an algorithmic authorization, or combinations thereof.

21. The secure authentication system of claim 16, wherein, prior to transmission, the authenticated fragmented token is linked to the advertisement upon a customer interaction with the interactive advertisement displayed by the customer device.

* * * * *